(12) United States Patent
Philipp et al.

(10) Patent No.: US 8,494,701 B2
(45) Date of Patent: Jul. 23, 2013

(54) METHOD AND DEVICE FOR OPERATING A HYBRID VEHICLE

(75) Inventors: Kai Philipp, Lagesbüttel (DE); Jörg Rieling, Braunschweig (DE); Marko Wollenberg, Cremlingen (DE)

(73) Assignee: Volkswagen AG, Wolfsburg (DE)

( * ) Notice: Subject to any disclaimer, the term of this patent is extended or adjusted under 35 U.S.C. 154(b) by 331 days.

(21) Appl. No.: 12/809,735

(22) PCT Filed: Dec. 19, 2008

(86) PCT No.: PCT/EP2008/010935
§ 371 (c)(1),
(2), (4) Date: Aug. 20, 2010

(87) PCT Pub. No.: WO2009/080315
PCT Pub. Date: Jul. 2, 2009

(65) Prior Publication Data
US 2010/0312426 A1    Dec. 9, 2010

(30) Foreign Application Priority Data

Dec. 20, 2007 (DE) .......................... 10 2007 061 545

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*G06F 19/00* (2011.01)
*G06G 7/70* (2006.01)

(52) U.S. Cl.
USPC .............................. 701/22; 701/99; 701/100

(58) Field of Classification Search
None
See application file for complete search history.

(56) References Cited

U.S. PATENT DOCUMENTS

| 6,575,257 | B1* | 6/2003 | Ikkai et al. .................. 180/65.8 |
| 2003/0047155 | A1 | 3/2003 | Chang ........................ 123/179.2 |
| 2006/0224279 | A1 | 10/2006 | Mori .................................. 701/1 |
| 2009/0066499 | A1* | 3/2009 | Bai et al. ...................... 340/459 |

FOREIGN PATENT DOCUMENTS

| DE | 19926697 | 12/2000 |
| DE | 10222351 | 11/2002 |
| DE | 10211466 | 8/2003 |
| EP | 1647707 | 4/2006 |

OTHER PUBLICATIONS

International Search Report and Written Opinion for Application No. PCT/EP2008/010935 (12 pages), Feb. 25, 2009.

* cited by examiner

*Primary Examiner* — Paul Danneman
(74) *Attorney, Agent, or Firm* — King & Spalding L.L.P.

(57) ABSTRACT

In a method and a device (8) for operating a hybrid vehicle (1), the internal combustion engine (2) of the hybrid vehicle is started automatically in case the hybrid vehicle (1) is in a ready-to-drive mode and an opening of an engine covering (4) of the hybrid vehicle is detected.

9 Claims, 1 Drawing Sheet

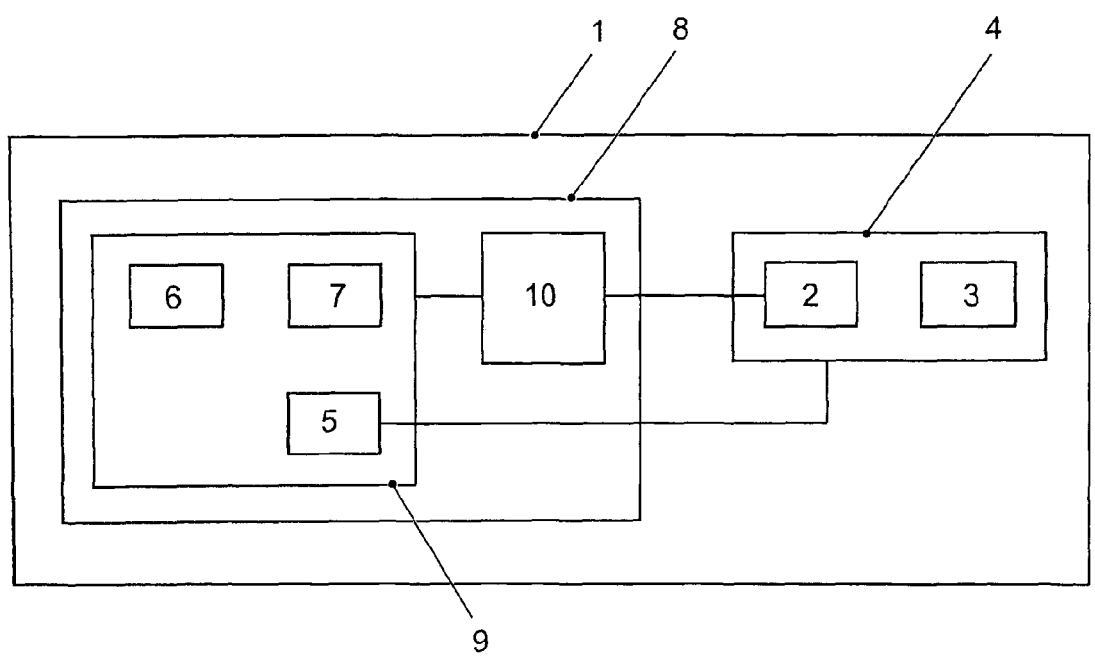

METHOD AND DEVICE FOR OPERATING A HYBRID VEHICLE

CROSS-REFERENCE TO RELATED APPLICATIONS

This application is a U.S. National Stage Application of International Application No. PCT/EP2008/010935 filed Dec. 19, 2008, which designates the United States of America, and claims priority to German Application No. 10 2007 061 545.2 filed Dec. 20, 2007, the contents of which are hereby incorporated by reference in their entirety.

TECHNICAL FIELD

The present invention relates to a method and a device for operating a hybrid vehicle in order to caution about a potential hazard, in particular about a hazard caused by a readiness for operating or readiness to drive the hybrid vehicle not realized by the user.

BACKGROUND

Modern hybrid vehicles often have a start/stop equipment by means of which the engine of the hybrid vehicle is stopped as soon as the hybrid vehicle stops longer than a predetermined time period (for example 1 second) to thus save fuel. As soon as the driver subsequently actuates an accelerator pedal of the hybrid vehicle, actuates the clutch or selects a gear, the engine automatically restarts to further power the hybrid vehicle. Furthermore it is common in modern hybrid vehicles comprising an internal combustion engine and an electric engine that the internal combustion engine of the hybrid vehicle is started automatically under certain conditions, in particular when the hybrid vehicle detects that the charging state of its battery is below a predetermined threshold value.

This automatic start-up of the engine, however, besides the previously mentioned advantage of saving fuel also has a risk potential which is not negligible, since it is not desirable in certain situations that the engine is being started, for example when an infant, who is playing in the hybrid vehicle, actuates the acceleration pedal while playing or when certain maintenance work is carried out in the engine compartment, for example.

It is known from DE 102 11 463 A1 to monitor the state of the engine hood of the vehicle in a hybrid vehicle and in the case that an opening of the engine hood is detected to disable a start-up of the internal combustion engine.

However, this approach is associated with the problem that, in the so-called ready-to-drive or electric mode, in which the internal combustion engine is not yet started, the vehicle may break down in the case of a defective engine hood sensor since no start-up of the internal combustion engine is possible in this case.

SUMMARY

According to various embodiments, an improved method and an improved device for operating a hybrid vehicle can be provided by means of which the risk potential for a user is reduced.

According to an embodiment, in a method for operating a hybrid vehicle,
wherein the hybrid vehicle comprises an internal combustion engine and an electric engine for powering the hybrid vehicle, in a ready-to-drive mode of the hybrid vehicle an engine covering of the hybrid vehicle is monitored by means of a sensor and the internal combustion engine is started up automatically in case the sensor does not indicate a closed state of the engine covering.

According to a further embodiment, in the ready-to-drive mode of the hybrid vehicle the internal combustion engine can be started up automatically in case it is detected that a driver of the hybrid vehicle is due to leave the hybrid vehicle. According to a further embodiment, it can be detected that the driver of the hybrid vehicle is due to leave the hybrid vehicle when at least one of the following conditions exists: at a driver's seat of the hybrid vehicle a buckle tongue of a seat belt of the hybrid vehicle is detached from an engagement with a seat belt lock, and a driver's door of the hybrid vehicle is opened. According to a further embodiment, the internal combustion engine can be stopped automatically in case the ready-to-drive mode of the hybrid vehicle is terminated.

According to another embodiment, a device for operating a hybrid vehicle comprises an internal combustion engine and an electric engine for powering the hybrid vehicle, wherein the device may comprise a sensor for monitoring an engine covering of the hybrid vehicle and evaluation means for evaluating an output signal of the sensor, and the device comprises starting means for automatically starting the internal combustion engine, wherein the evaluation means are formed such that they control the starting means for automatically starting the internal combustion engine in case the hybrid vehicle is in a ready-to-drive mode and the output signal of the sensor does not indicate a closed state of the engine covering.

According to a further embodiment of the above device, the evaluation means are formed such that they control the starting means for automatically starting the internal combustion engine in case the hybrid vehicle is in a ready-to-drive mode and the evaluation means detect that a driver of the hybrid vehicle is leaving the hybrid vehicle. According to a further embodiment of the above device, the evaluation means can be formed such that they detect that a driver of the hybrid vehicle is leaving the hybrid vehicle in case a buckle tongue of a safety belt dedicated to the driver is detached from an engagement with a seat belt lock or when a driver's door of the hybrid vehicle is opened. According to a further embodiment of the above device, the evaluation means are formed such that, after an automatic start-up of the internal combustion engine in the ready-to-drive mode of the hybrid vehicle, they cause an automatic stopping of the internal combustion engine in case the ready-to-drive mode of the hybrid vehicle is terminated by a user.

According to yet another embodiment, the above described device can be formed for performing the method as described above.

According to yet another embodiment, a hybrid vehicle may comprise an internal combustion engine and an electric engine for powering the hybrid vehicle and a device as described above.

BRIEF DESCRIPTION OF THE DRAWINGS

In the following an embodiment is described with the help of the drawing.

FIG. 1 schematically depicts a hybrid vehicle according to an embodiment comprising a device according to an embodiment.

DETAILED DESCRIPTION

According to various embodiments, a method for operating a hybrid vehicle is provided. In the process the internal combustion engine of the hybrid vehicle is started automatically at the time when a potential hazard situation is detected which is associated with an automatic start-up of the internal combustion engine or could be caused by an automatically starting internal combustion engine, respectively. As the engine is started automatically, for example a driver of the hybrid vehicle is advised of a potential hazard by means of a noise development of the activated engine or by means of vibrations caused by the activated engine. In this case the driver typically will stop the engine by deactivating the readiness to drive of the hybrid vehicle, for example by means of actuating a start/stop-button of the hybrid vehicle, whereby the engine is stopped and a new automatic start of the engine is inhibited.

Here, the readiness to drive of the hybrid vehicle is to mean a state of the hybrid vehicle also called an electric mode in which the internal combustion engine is not running, however, the electric engine is in a state corresponding to a switched on ignition in a conventional vehicle, so that by means of an actuation of the acceleration pedal of the hybrid vehicle a driving torque may be carried out onto the hybrid vehicle by the electric engine.

In an embodiment the potential hazard is present at the time when an engine covering of the hybrid vehicle is opened, so that in this case the internal combustion engine is started as a warning. Preferably, the output signal of a respective engine hood sensor thereby is evaluated such that the internal combustion engine is started automatically in case the output signal does not indicate a closed state of the engine covering or the engine hood. In this case in the conditions previously mentioned therefore an automatic start of the internal combustion engine is carried out also at the time when the engine hood sensor has failed, so that an unwanted break down of the hybrid vehicle in the ready-to-drive mode is prevented.

An engine suddenly starting up may lead to serious injuries when operations in the engine compartment of the hybrid vehicle are carried out just at that time. The engine covering not only serves the purpose to cover the engine, but thereby also serves to protect against rotating parts in the engine compartment. With a well designed engine covering it is therefore not possible to reach rotating parts in the engine compartment without opening the engine covering. As in this embodiment the engine thus is started when the engine covering is opened (provided the readiness to drive of the hybrid vehicle is activated), the user advantageously is warned by the startup of the engine. Due to the fact that the engine immediately starts when the engine hood is opened, the user cannot be taken by surprise in the case of a sudden start of the internal combustion engine. Advantageously, this is independent of whether or not the driver is safely located on the driver's seat. By means of the startup of the engine directly when opening the engine covering the executor of the maintenance work receives a warning message that it is advisable to stop the engine for executing the maintenance work, for example by deactivating the readiness to drive of the hybrid vehicle. Advantageously, thereby the protection against injuries is increased which may be caused by an engine starting up automatically.

In a further embodiment a hazard potential is diagnosed at the time when it is detected that the driver of the hybrid vehicle leaves the hybrid vehicle or that the driver is not definitely present. Thereby, the driver leaving the vehicle may be detected in that it is detected that a buckle tongue of a safety belt of the hybrid vehicle is detached from a seat belt lock of the hybrid vehicle at the driver's seat. For example, the buckle of the safety belt is detached from the seat belt lock or retracted from the seat belt lock by the driver of the hybrid vehicle at the time when the driver unfastens. A hand movement which generally is carried out short before leaving the hybrid vehicle. The action when the driver is leaving the vehicle may also be detected in a way that an opening of a driver's door of the hybrid vehicle is detected. With a hybrid vehicle ready for use the opening of the driver's door is a sound indication that the driver wants to leave the hybrid vehicle.

According to other embodiments, a device for operating a hybrid vehicle is provided. In doing so, the device comprises starting means to start the internal combustion engine of the hybrid vehicle automatically when the previously described hazard situation is detected in the ready-to-drive mode of the hybrid vehicle. Evaluation means exist to detect such a hazard caused by the readiness to drive of the hybrid vehicle which possibly is not recognized by the user. In doing so, the device is formed such that the internal combustion engine of the hybrid vehicle is started up automatically by means of the starting means as soon as the evaluation means have detected the hazard in the ready-to-drive mode of the hybrid vehicle.

An engine hood sensor detects the state of the engine hood or engine covering of the hybrid vehicle. The evaluation means are formed such that they detect the hazard as soon as the engine hood sensor does not indicate a contact, i.e. no closed state of the engine hood.

In a further embodiment the evaluation means are formed such that they detect a hazard as soon as a buckle tongue of a driver safety belt of the hybrid vehicle is detached from the seat belt, which for example is the case when the driver of the hybrid vehicle unfastens. However, the evaluation means may also detect a hazard when the driver's door is opened.

The advantages of the device according to various embodiments basically correspond to the advantages of the method which have been discussed elaborately in advance, so that a recapitulation is abandoned here.

Depicted in the sole Figure is a hybrid vehicle 1 according to an embodiment which comprises a device 8 according to an embodiment for automatically starting up an internal combustion engine 2 of the hybrid vehicle 1. Aside from the internal combustion engine 2 the hybrid vehicle 1 also comprises an electric engine 3 for powering the hybrid vehicle, wherein the internal combustion engine 2 as well as the electric engine 3 are covered by means of an engine covering or an engine hood 4, respectively. Device 8 on the one hand comprises a starting means 10 for starting up the internal combustion engine 2, and on the other hand evaluation means 9 to detect a hazard situation emanating form the internal combustion engine 2 and/or a hazard situation which emanates from an undetected readiness to drive of the hybrid vehicle 1. Furthermore, schematically depicted is a seat belt lock 6 for a driver's seat (not shown) of the hybrid vehicle 1, a driver's door 7 and an engine hood sensor 5.

In the following the operation of the hybrid vehicle 1 according to various embodiments is described.

In order to drive the hybrid vehicle 1 a driver of the hybrid vehicle 1 activates the readiness to drive of the hybrid vehicle 1, for example by pressing a start/stop-button (not shown) of the hybrid vehicle 1. When the hybrid vehicle 1 is ready for operation, when thus the readiness to drive of the hybrid vehicle 1 is given, an actuation of the accelerator pedal (not shown) of the hybrid vehicle 1 is sufficient to generate a driving torque with respect to the hybrid vehicle 1. When the acceleration pedal is actuated during a standstill of the hybrid vehicle 1 the driving torque normally is generated by the electric engine 3. Typically, the internal combustion engine 2 is started at the time when a target momentum requested by the driver is above a maximum torque delivered by the electric engine 3 or when the charging state of a battery (not shown)

of the hybrid vehicle 1, by which energy is supplied to the electric engine 3, is below a predetermined threshold value. In the latter case the battery then is charged by means of the internal combustion engine 2.

The hybrid vehicle 1 comprises an automatic which as a general rule stops the internal combustion engine 2 when the hybrid vehicle 1 comes to a standstill. By means of actuating the acceleration pedal the internal combustion engine 2 then may be restarted automatically without a further hand movement (for example pressing any button) being required provided that the readiness to drive of the hybrid vehicle 1 still is available. Furthermore, with available readiness to drive during a standstill of the hybrid vehicle 1 it is also possible that the internal combustion engine 2 is started automatically in order to charge the battery to avoid that the battery falls below the predetermined threshold value of its charging state.

Thereby, especially during a standstill, with respect to its internal combustion engine 2 a larger risk potential emanates form the operational hybrid vehicle 1 as would be the case in conventional hybrid vehicles in which the engine solely is started by means of a specific and targeted manual action (for example by means of actuating an ignition key or a start/stop-button). This is also based on the fact that in conventional hybrid vehicles the readiness to drive of the respective hybrid vehicle is unmistakably indicated to the driver of the hybrid vehicle in each case via the operating internal combustion engine, while this indication (internal combustion engine 2 is operating) for economic reasons is omitted in the hybrid vehicle 1 according to various embodiments during a standstill in order to save fuel.

For this reason, the hybrid vehicle 1 according to various embodiments cautions about certain situations in which the risk potential emanating from the automatically starting internal combustion engine 2 is particularly high. The hybrid vehicle 1 generates this warning in that it starts up the internal combustion engine 2 by itself in theses certain situations in order to caution about the operating internal combustion engine 2 by means of the vibrations and the noise development of the internal combustion engine 2 or to indicate the readiness to drive of the hybrid vehicle 1, respectively. The cautioning about a readiness to drive of the hybrid vehicle 1 which possibly is not recognized by the driver of the hybrid vehicle 1 is also carried out based on a requirement for protecting from intoxication by exhaust gases in the case of a parked hybrid vehicle since, as already explained previously, the internal combustion engine in an operable hybrid vehicle always starts and thereby emits toxic exhaust gases at the time when the charging state of the battery is below the predetermined threshold value.

These certain situations are given when no driver is present in the hybrid vehicle 1 or when the engine hood 4 of the internal combustion engine 2 is open. For this reason the hybrid vehicle 1, if it is ready for operation, starts up its internal combustion engine 2 automatically when it detects via the engine hood sensor 5 that the engine hood 4 is open and/or when the hybrid vehicle 1 detects via the seat belt lock 6 or the driver's door 7 that the driver of the hybrid vehicle 1 is due to leave the hybrid vehicle 1. Hence, the internal combustion engine 2 is also started up automatically at the time when the driver sits inside the hybrid vehicle 1 (thus a definite presence of the driver is detected via the seat belt lock 6 and the driver's door 7) and a further person opens the engine hood 4 in order to thereby protect the further person from injuries caused by a sudden startup of the internal combustion engine 2. In other words, the operating internal combustion engine 2 informs about the readiness to drive of the hybrid vehicle 1, and persons are not caught off guard or are not endangered by a sudden start-up of the internal combustion engine 2, particularly with an opened engine hood 4.

When the ready-to-drive mode is terminated by the user, for example by actuating the start/stop-button or another operating element, the internal combustion engine 2 is again automatically stopped by the device 8 previously described.

REFERENCE NUMERALS

1 Hybrid vehicle
2 Internal combustion engine
3 Electric engine
4 Engine hood
5 Engine hood sensor
6 Seat belt lock
7 Driver's door
8 Device
9 Evaluation means
10 Starting means

What is claimed is:

1. A method for operating a hybrid vehicle, wherein the hybrid vehicle comprises an internal combustion engine and an electric engine for powering the hybrid vehicle, the method comprising:
   in a ready-to-drive mode of the hybrid vehicle:
      a sensor monitoring an engine covering of the hybrid vehicle, and
      automatically starting the internal combustion engine in response to the sensor indicating an open state of the engine covering.

2. The method according to claim 1, wherein in the ready-to-drive mode of the hybrid vehicle the internal combustion engine is started up automatically in response to detecting that a driver of the hybrid vehicle is leaving the hybrid vehicle.

3. The method according to claim 2, comprising detecting that the driver of the hybrid vehicle is leaving the hybrid vehicle when at least one of the following conditions exists:
   at a driver's seat of the hybrid vehicle a buckle tongue of a seat belt of the hybrid vehicle is detached from an engagement with a seat belt lock, and
   a driver's door of the hybrid vehicle is opened.

4. The method according to claim 1, further comprising, after automatically starting the internal combustion engine, automatically stopping the internal combustion engine in response to the ready-to-drive mode of the hybrid vehicle being terminated.

5. A system for operating a hybrid vehicle comprising an internal combustion engine and an electric engine for powering the hybrid vehicle, the system comprising:
   a sensor which in a ready-to-drive mode of the hybrid vehicle is configured to monitor an engine covering of the hybrid vehicle, and
   a device configured to automatically start the internal combustion engine in response to the sensor indicating an open state of the engine covering.

6. The system according to claim 5, wherein in the ready-to-drive mode of the hybrid vehicle, the device is further configured to automatically start the internal combustion engine in response to detecting that a driver of the hybrid vehicle is leaving the hybrid vehicle.

7. The system according to claim 5, wherein the device is configured to detect that the driver of the hybrid vehicle is leaving the hybrid vehicle when at least one of the following conditions exists:

at a driver's seat of the hybrid vehicle a buckle tongue of a seat belt of the hybrid vehicle is detached from an engagement with a seat belt lock, and a driver's door of the hybrid vehicle is opened.

8. The system according to claim 5, wherein the device is further configured to, after automatically starting the internal combustion engine, automatically stop the internal combustion engine in response to the ready-to-drive mode of the hybrid vehicle being terminated.

9. A method for operating a hybrid vehicle, wherein the hybrid vehicle comprises an internal combustion engine and an electric engine for powering the hybrid vehicle, the method comprising:

in a ready-to-drive mode of the hybrid vehicle:

monitoring at least one of a seat belt lock and a driver side door of the hybrid vehicle to determine whether a driver of the hybrid vehicle is leaving the vehicle, and automatically starting the internal combustion engine in response to determining that the driver of the hybrid vehicle is leaving the vehicle.

* * * * *